358-74. OR 2,892,028 SR

SEARCH ROOM

June 23, 1959 D. H. PRITCHARD ET AL 2,892,028

AUTOMATIC WHITE LEVEL LIMIT CONTROL

Filed Aug. 17, 1955

T 358/74
X 5173
X 5230

INVENTOR.
DALTON H. PRITCHARD
& ALFRED C. SCHROEDER
BY [signature]
ATTORNEY

United States Patent Office 2,892,028
Patented June 23, 1959

2,892,028

AUTOMATIC WHITE LEVEL LIMIT CONTROL

Dalton H. Pritchard, Princeton, N.J., and Alfred C. Schroeder, Huntingdon Valley, Pa., assignors to Radio Corporation of America, a corporation of Delaware Application August 17, 1955, Serial No. 529,051

5 Claims. (Cl. 178—7.3)

The present invention relates generally to automatic white level limit control circuits and particularly to circuits for preventing overload of the high voltage supply or kinescope in a television signal receiving system.

In television receivers in which the video or luminance signal handling circuits between the second detector and the image reproducing device are direct coupled, the direct current component of the detected luminance signal is applied to the video signal amplifier control grid circuit along with the luminance signal variation components. The direct current component determines the average voltage in the anode circuit of the luminance signal amplifier and is a direct function of the average brightness in the scene being televised.

This is an ideal operating condition except that on scenes of high average brightness, the kinescope ultor current may exceed the permissible maximum, or the high voltage power source may be overloaded resulting in image deterioration through misconvergence and defocusing. Reducing the setting of the contrast and/or brightness controls to prevent overload on high average brightness scenes results in the reproduction of scenes of normal or low average brightness at a highlight and brightness level greatly below that desirable and below the average capability of the kinescope and high voltage power supply.

An object of the present invention is to provide an improved circuit for preventing overload of image reproducing devices and associated power sources.

It is a further object of the present invention to provide an improved circuit arrangement for preventing sustained overload of either an image reproducing device or the associated power supply without sacrificing highlight brightness on scenes having high peak but low-average brightness.

It is another object of the present invention to provide a kinescope and power supply protection circuit for preventing overload thereof without loss of the direct current component.

In accordance with the present invention, sustained overload of the voltage source or excessive current in the image reproducing device is substantially prevented by reducing the gain of the receiving system during high-average-brightness scenes. This reduction in gain is effected by means of signal information derived from the high voltage supply circuit which indicates a deviation from a predetermined circuit condition.

Figure 1:
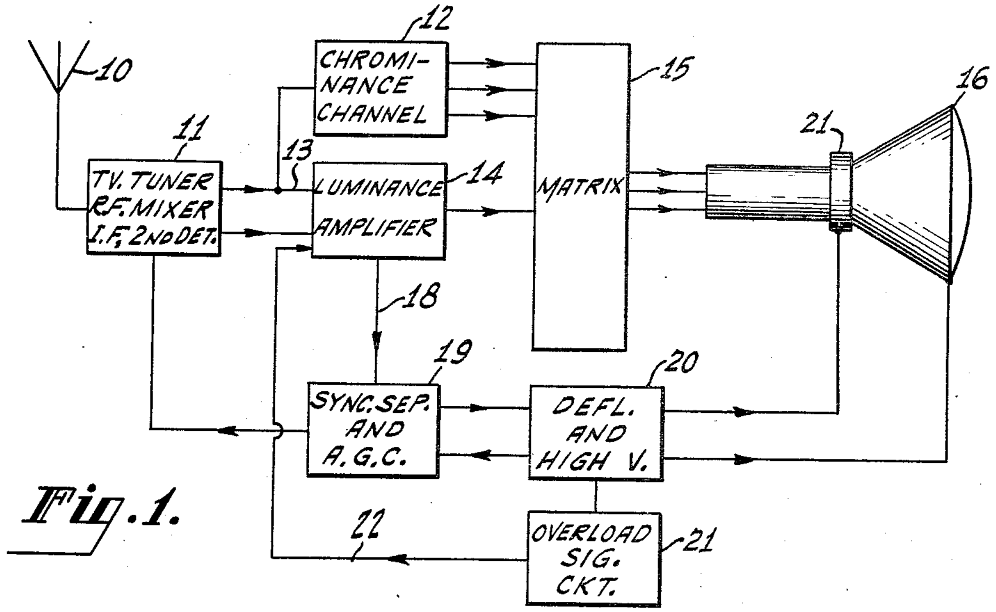
Figure 2:
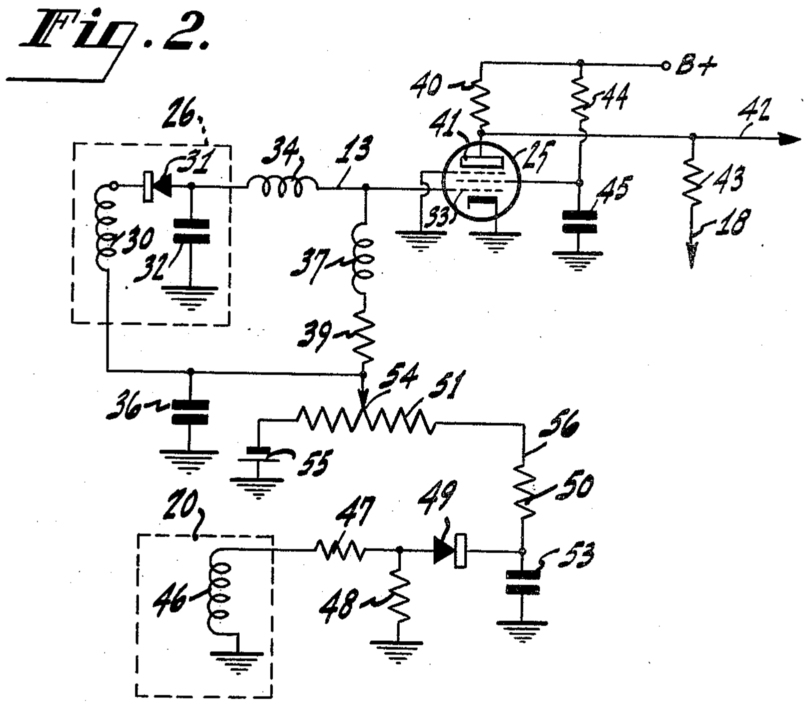

Other objects and advantages of the present invention will become apparent from a reading of the following specification and an inspection of the accompanying drawings in which:

Figure 1 illustrates, by way of a block diagram, a color television signal receiving system embodying the present invention; and Figure 2 is a schematic circuit diagram of an automatic white level limit control or overload protection circuit provided in accordance with the present invention.

Referring to the drawing, and particularly to Figure 1, there is shown a color television receiver of well-known form such, for example, as that described in "Practical Color Television for the Service Industry," published by RCA Service Company, Inc., Camden, New Jersey, second edition, April 1954. While the specific form of apparatus for processing the received signal does not constitute a part of the present invention, it may be noted that the receiver may be adapted to operate upon signals made up in accordance with standards set by the Federal Communication Commission on December 17, 1953.

In accordance with those standards, information regarding the luminance of a television scene is transmitted by a luminance signal which is an amplitude-modulation of a main carrier wave with video signals proportional to the elemental brightness values of the scene, and the chrominance information is transmitted by a phase and amplitude-modulated subcarrier wave. The instantaneous phase of the chrominance subcarrier wave with respect to a color reference phase is indicative of a selected hue, and the instantaneous amplitude of the wave is proportional to the degree of saturation of the hue.

The antenna 10, in the apparatus of Figure 1, is adapted to intercept the television signal and to apply it to the input terminals of a television tuner section 11 which may be understood as including the usual radio-frequency, mixer, intermediate-frequency and second detector stages.

It is, of course, to be understood that this is a simplified showing of the interaction of the various portions of a color television receiving system. The detected signal information is applied simultaneously to a chrominance channel 12 and by means of a conductor 13 to a luminance signal amplifier 14. Color difference signals are derived from the chrominance subcarrier wave and applied along with the amplified luminance signal to a matrix 15. The matrix 15 is adapted to combine the signals received from the chrominance channel and from the luminance channel in such a manner as to provide color signals which may be applied to an image reproducing device or kinescope 16. The kinescope 16 may be of the type described in the article entitled, "Three-Gun Video Mask Color Kinescope" by H. B. Law which appeared in the October, 1951 issue of the Proceedings of the I.R.E.

Signals which may or may not be of the same polarity as that applied to a matrix 15 are also derived from the load circuit of the luminance amplifier 14 and applied via a conductor 18 to a sync separator and AGC circuit 19 of the receiving system. The synchronizing signals are utilized to synchronize the deflection apparatus 20 of the receiving system with that of the transmitting system. The deflection and high voltage apparatus 20 is connected to the deflection yokes 21 in order to provide a rectangular scanning raster on the face of the kinescope 16. The high voltage which is developed in the high voltage and deflection apparatus 20 is also applied to the kinescope 16 in order to provide electron beam acceleration.

The AGC system utilized in any particular color television receiving system may be of the keyed variety. With this type of AGC system, a flyback pulse is applied from the deflection and high voltage apparatus 20 to the sync separator and AGC portion 19 to establish, in cooperation with signals received from the luminance signal amplifier 14, an AGC voltage which is representative of the level of the received signal. The AGC voltage, thus developed, is applied to one or more of the signal translating portions of the receiving system in order to control the gain of these stages as an inverse function of the amplitude of the received signal.

It has been found, however, that with conventional receiving systems, a high average luminance condition may result in signal information being applied to the kinescope 16 which tends to result in an excessively high current condition in the kinescope. Prior systems which have been devised to avoid excessively high current conditions by means of passive networks are such as to limit the kinescope operating conditions in such a manner as the result in reduced picture quality.

In accordance with one aspect of the present invention, a high current condition in the kinescope or an overload of the high voltage supply is prevented without a loss in picture quality by applying a signal from the deflection and high voltage supply circuit 20 to an overload signal circuit 21. The overload signal circuit 21 is connected to the luminance signal amplifier 14 through the conductor 22 and adapted to alter the signal gain of the system in the presence of signals which would tend to cause overload. The basic source of information indicating an overload condition is the high voltage transformer. However, other circuits in the receiving system, such as, the AGC circuit are affected by high voltage pulse amplitude. These circuits which are so affected may be, therefore, utilized as the overload signal supply circuit in place of the high voltage supply.

One embodiment of the present invention which utilizes the high voltage source as the overload signal source is shown in Figure 2. Signals which are applied to the luminance signal amplifier 25 are derived from a luminance detector or video detector illustrated as a dashed rectangular 26 containing the secondary winding 30 of a detector transformer, a diode detector 31 and a carrier frequency by-pass capacitor 32. The high signal voltage terminal of the video detector 26 is connected to the control grid 33 through a choke coil 34 and the conductor 13. The other terminal of the detector is connected to the ungrounded terminal of a bypass capacitor 36. A second choke coil 37 and a detector load resistor 39 are connected in series relation between the control grid 33 and the other terminal of the detector 26 to complete the signal input circuit to the video amplifier 25.

The load circuit for the luminance signal amplifier 25 includes a load resistor 40 connected between the anode 41 and the positive terminal B+ of a source of direct current potential such as the low voltage supply for the associated receiving system. It is to be understood that the load circuit illustrated in Figure 2 is a simplified one and that in actual operation peaking coils and other circuit elements may be present.

Signals may be derived directly from the anode 41 and applied to the control electrodes of the associated color kinescope or matrix via the conductor 42 depending on the particular system utilized. The direct current component of the luminance signal available at the anode 41 is applied through an isolating resistor 43 to the automatic gain control portion of the associated receiving system in order to control the gain of the overall system as above discussed.

Energizing voltage for the screen grid may be applied in a conventional manner by a voltage dropping resistor 44 and a low impedance signal path to ground is provided by a screen grid by-pass capacitor 45.

The overload signal source in the present embodiment is represented as an inductor 46 contained in the high voltage supply source represented by the dashed rectangle 20. The inductor 46 may represent a separate winding on the high voltage transformer or merely a tapped portion of an already existing winding. The purpose of the inductor 46 is to provide a source of signals having an essentially constant amplitude under normal conditions and which change in amplitude in accordance with an overload condition.

These signals are applied by means of a voltage divider network including the series arrangement of a pair of resistors 47 and 48 to an error signal rectifier or unilaterally conducting device illustrated as a diode 49. A rectified voltage is accordingly developed across the diode load resistor 50 and contrast control potentiometer 51. Filtering is provided by means of a filter capacitor 53 connected between the anode of the rectifier 49 and signal ground. It is noted that the time constant provided by the filter capacitor 53 and the associated resistors should be long enough to provide effective filtering at the frequency of the pulse source which may be at the horizontal line frequency of 15,750 cps. Moreover, the time constant must be short enough to allow direct current variations in accordance with average high luminance conditions which provide overload while not allowing direct current variations or instantaneous high luminance conditions of short duration.

Contrast control is provided by means of an adjustable slider or tap 54. The bias source utilized for the contrast control is illustrated as a battery 55 connected between one terminal of the potentiometer 51 and signal ground. The battery 55 is a general representation only and in actual practice may be a convenient bias source associated with the receiving system. As a matter of convenience in design, the voltage divider resistors 47 and 48, the load resistor 50, the potentiometer 51 and the value of the voltage provided by the battery 55 may be chosen to provide a voltage at the junction 56 of the load resistor 50 and the potentiometer 51 having a value of essential zero with respect to signal ground under average luminance or non-overload conditions. With this selection of components, the operation of the contrast control under non-overload conditions, is conventional. However, upon an overload condition due to high average luminance signal, the voltage at the junction 56 decreases or becomes negative thereby providing an increased negative bias.

Since, under these conditions the maximum amplitude of the white level excursions are reduced, the voltage at the anode 41 is more positive than it would otherwise be and the automatic gain control portion of the system is operative to reduce the overall gain of the associated signal translating portions of the receiving system. This tends to reduce the application of signal information which might result in an overload condition in the associated color kinescope. However, the operation of the automatic white level control in and of itself, reduces the possibility of an excessive current condition in the kinescope since the direct current level to which white level excrusions of the signal are permitted to go is altered in accordance with the action of the automatic white level control circuit.

Under signal conditions which would tend to provide an excessively high luminescent condition in the kinescope, the direct current voltage available at the junction 56 is more negative than normal. The direct current bias change reduces the signal voltage variations at the control grid 33 and causes the anode 41 to be more positive than it would otherwise be. The sync tips which operate the associated automatic gain control system therefore become more positive as though the signal were increased and the automatic gain control voltage tends to reduce the detected signal.

The overload protection circuit provided in accordance with the present invention therefore prevents the application of signals having an excessive direct current component to an associated image reproducing device in a television receiving system. This is accomplished by means of an error signal circuit which alters the direct current voltage to which the white level is allowed to swing. However, this is done without affecting the direct current voltage to which black is referred.

Having thus described the present invention, what is claimed is:

1. In a television receiver, the combination of: an image display apparatus requiring a high-voltage power supply potential and adapted to produce visible images in response to an applied television signal and having signal input terminals to receive video signals representative of said television signal including synchronizing information pulses, the high-voltage power requirements of said display apparatus being a continuous function of the scene brightness depicted by said television signal, said display apparatus also having high-voltage input terminals requiring a high-voltage supply potential in excess of a given minimum value at a given maximum current level; a high-voltage power supply means having output terminals across which is developed a high-voltage output potential for said display apparatus, said output potential being in excess of said minimum value for current levels less than said maximum; means operatively connecting said power supply output terminals to said display apparatus high-voltage input terminals to apply said developed high-voltage potential to said image display apparatus; a source of television signals; a multistage signal amplifying means including a video amplifier having an input circuit and output circuit, the input circuit of said amplifying means being operatively connected to said source of television signals; means coupling said display apparatus signal input terminals to said output circuit of said amplifying means to operatively apply said amplified video signal to said image display apparatus; gain-controlling means included in said amplifying means for controlling the gain thereof in response to an applied control potential; an overload-signal producing circuit comprising, means for deriving a continuous direct current voltage proportional to the output potential of said high-voltage power supply; means coupling said overload-signal producing circuit to the input circuit of said video amplifier for applying said derived direct voltage to said input circuit, said coupling means including means responsive to the amplitude of said derived direct voltage so as to maintain the potential at said input circuit normal during the time said high-voltage supply potential is in excess of said minimum value and to cause the potential at said input circuit to go in a negative direction during the time said high-voltage supply potential is less than said minimum value; a control potential deriving means operatively coupled to the output circuit of said video amplifier for deriving a control potential indicative of the amplitude of said synchronizing pulses at said output circuit, and means operatively coupling said control potential deriving means to said gain-controlling means for controlling the gain of said signal amplifying means in response to said control potential.

2. In a television receiving system, the combination comprising: a source of video signals having an alternating current component and a direct current component; a video amplifier for translating said video signals, said video amplifier having an input circuit comprising a grid element and a cathode element, means coupling the input circuit of said video amplifier to said source of video signals, a source of bias potential for said video amplifier; a high-voltage power transformer having a winding across which is developed a voltage proportional to said high-voltage, a rectifier device and a load circuit connected in series relationship with said winding for obtaining a unilateral potential across said load circuit indicative of said proportional voltage, said load circuit including said source of bias potential and a resistance element in series relation, said resistance element having an adjustable tap, a storage capacitor connected across said load circuit, one side of said winding being connected to a point of ground reference potential, the positive terminal of said source of bias potential and one terminal of said storage capacitor also being connected to said point of ground reference potential, said rectifier device being connected with such polarity that will derive a voltage in a positive direction across said load circuit, said cathode element being conductively connected to said point of ground reference potential, and a direct-current connection from said adjustable tap to said grid element for applying the voltage derived across said load circuit to decrease the bias potential applied to said video amplifier with a decrease in said high voltage.

3. An automatic white-level control circuit for a television receiver comprising: a high-voltage supply circuit adapted to provide a substantially constant voltage subject to variation upon overload of said supply, means for processing a received television signal to provide an alternating current component and a direct current component of said signal, a video signal amplifier direct current coupled with said last-named means, means coupled with said amplifier for providing an operating bias therefor, voltage developing means coupled with said high-voltage supply circuit for providing a continuous direct current voltage proportional to said high voltage, and circuit means coupled between said voltage developing means and said video signal amplifier for controlling the operating bias of said video signal amplifier directly in accordance with said direct current voltage.

4. In a color television signal receiving system having multi-color image reproducing means, high voltage supply means for energizing said reproducing means, signal amplifier means for applying the direct current and alternating current component of a received signal to said reproducing means and automatic gain control means for controlling the amplitude of the signal components applied to said reproducing means, an automatic white level control comprising means coupled with said high voltage supply means for deriving therefrom a control voltage having normally a substantially constant amplitude which varies under overload conditions, means for biasing said signal amplifier means, means for applying said control voltage to said signal amplifier means to vary the bias established by said biasing means such that upon overload of said high voltage supply means the direct current and alternating current components are modified to prevent a continuation of said overload condition.

5. In a color television signal receiving system having image reproducing means, high voltage supply means for energizing said reproducing means, signal translating means for applying signals to said reproducing means automatic gain control means for controlling the gain of said signal translating means as an inverse function of the amplitude of said applied signals, an automatic white level control comprising, means for deriving a continuous overload signal from said high-voltage supply means indicative of a conditional overload of said high voltage power supply, and circuit means coupled between said last-named means and said signal translating means for effecting a reduction in the gain thereof to prevent a continuation of said overload.

References Cited in the file of this patent

UNITED STATES PATENTS 2,672,505 Schwarz ............... Mar. 16, 1954

FOREIGN PATENTS 737,070 Germany ............... May 27, 1943